(12) United States Patent
Ali et al.

(10) Patent No.: US 11,507,668 B2
(45) Date of Patent: Nov. 22, 2022

(54) CRYPTOGRAPHIC KEY SECURITY

(71) Applicant: HEWLETT-PACKARD DEVELOPMENT COMPANY, L.P., Spring, TX (US)

(72) Inventors: Vali Ali, Houston, TX (US); Rick Bramley, Mansfield, MA (US); Endrigo Nadin Pinheiro, Porto Alegre (BR); Rodrigo Dias Correa, Porto Alegre (BR); Ronaldo Rod Ferreira, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 302 days.

(21) Appl. No.: 16/479,495

(22) PCT Filed: Sep. 19, 2017

(86) PCT No.: PCT/US2017/052181
§ 371 (c)(1),
(2) Date: Jul. 19, 2019

(87) PCT Pub. No.: WO2019/059887
PCT Pub. Date: Mar. 28, 2019

(65) Prior Publication Data
US 2020/0210588 A1    Jul. 2, 2020

(51) Int. Cl.
*G06F 21/62* (2013.01)
*G06F 21/57* (2013.01)
(Continued)

(52) U.S. Cl.
CPC ........ *G06F 21/575* (2013.01); *G06F 9/44505* (2013.01); *G06F 21/602* (2013.01);
(Continued)

(58) Field of Classification Search
CPC ...... G06F 21/44; G06F 21/575; G06F 21/602; G06F 21/62; G06F 2221/0753;
(Continued)

(56) References Cited

U.S. PATENT DOCUMENTS 7,376,968 B2    5/2008    Ritz et al.
9,037,854 B2    5/2015    Roth et al.
(Continued)

OTHER PUBLICATIONS

Mark, BIOS and UEFI explained, all you need to know about, Apr. 2017.*

(Continued)

*Primary Examiner* — Minh Dinh
(74) *Attorney, Agent, or Firm* — HP Inc. Patent Department

(57) ABSTRACT

Examples associated with cryptographic key security are described. One example system includes a secure storage accessible to a basic input/output system (BIOS). A BIOS security module stores an authorization value in a fixed location in the secure storage. The authorization value is stored by the BIOS during a boot of the system. A cryptographic key module reads the authorization value from the fixed location, overwrites the authorization value in the fixed location, and obtains a cryptographic key using the authorization value.

15 Claims, 5 Drawing Sheets

(51) Int. Cl.
*G06F 9/445* (2018.01)
*G06F 21/60* (2013.01)

(52) U.S. Cl.
CPC ...... *G06F 21/62* (2013.01); *G06F 2221/0753* (2013.01); *G06F 2221/0755* (2013.01)

(58) Field of Classification Search
CPC ......... G06F 2221/0755; G06F 9/44505; H04L 9/08; H04L 9/0863; H04L 9/0894; H04L 9/3226
See application file for complete search history.

(56) References Cited

U.S. PATENT DOCUMENTS

| | | |
|---|---|---|
| 9,367,689 B2 | 6/2016 | Henry |
| 2006/0015718 A1 | 1/2006 | Liu et al. |
| 2010/0050244 A1 | 2/2010 | Tarkhanyan et al. |
| 2010/0083002 A1 | 4/2010 | Cui et al. |
| 2010/0111309 A1 | 5/2010 | Khatri et al. |
| 2015/0015403 A1 | 1/2015 | LeMaistre |
| 2015/0081257 A1* | 3/2015 | Cen .......................... G06F 21/82 703/2 |
| 2015/0154031 A1 | 6/2015 | Lewis |
| 2017/0124329 A1 | 5/2017 | Ghafoor et al. |
| 2017/0286705 A1* | 10/2017 | Li ............................ H04L 63/06 |

OTHER PUBLICATIONS

Haken, L., Bypassing Local Windows Authentication to Defeat Full Disk Encryption, Nov. 12, 2015.

* cited by examiner

CRYPTOGRAPHIC KEY SECURITY

BACKGROUND

Generation of encryption keys is a recurrent task for securing software and data. Encryption keys are used for a variety of tasks including encrypting and decrypting data, securely transmitting data and/or commands between applications, securely transmitting data and/or commands between components of a system, and so forth.

BRIEF DESCRIPTION OF THE DRAWINGS

The present application may be more fully appreciated in connection with the following detailed description taken in conjunction with the accompanying drawings.

DETAILED DESCRIPTION

Systems, methods, and equivalents associated with cryptographic key security are described. When cryptographic keys are generated, it may be desirable to persist the keys for later use because the key generation process may ensure that keys are generated randomly to prevent the key generation process from generating identical keys. Without persisting the keys, data encrypting using the keys may be unrecoverable. To protect the keys from undesirable accesses (e.g., by a malicious actor), the keys may be protected by an authorization value. In some cases this authorization may be a personal identification number (PIN) or password. However, a user input value may be an inadequate solution in certain instances, making it desirable for an authorization value to be obtainable without a user input.

Consequently, examples described herein discuss examples relating to a basic input/output system (BIOS) security process that stores an authorization value for generating and/or accessing encryption keys. During a boot of a system, the authorization value may be stored in a fixed location known to a trusted process responsible for generating or accessing the encryption keys. Once this trusted process has accessed the authorization value, the trusted process may erase the authorization value from the fixed location to prevent the authorization value from subsequently being accessed by a malicious entity.

Figure 1:
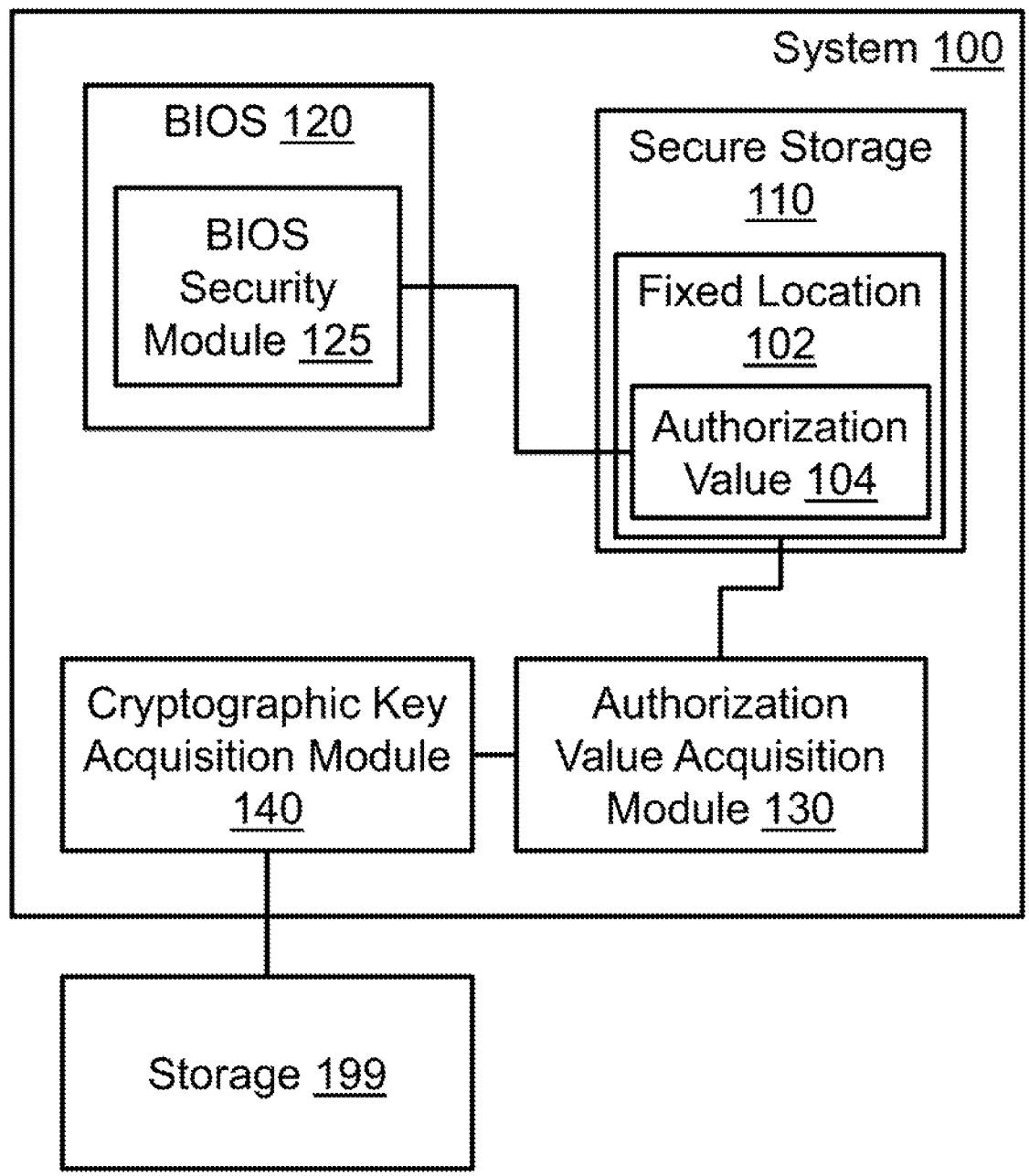
FIG. 1 illustrates an example system associated with cryptographic key security.

FIG. 1 illustrates an example system associated with cryptographic key security. It should be appreciated that the items depicted in FIG. 1 are illustrative examples, and many different systems, devices, and so forth, may operate in accordance with various examples.

FIG. 1 illustrates an example system 100 associated with cryptographic key security. As a part of starting up system 100 may use one or more cryptographic keys to perform various functions such as accessing data and encrypting communications between components. Creation of and/or access to these encryption keys may be secured by an authorization value 104. Because system 100 may use these cryptographic keys before it is feasible to obtain a user input of the authorization value, it may be desirable for system 100 to have a way to generate and/or access the cryptographic keys without a user input.

Consequently, system 100 includes a basic input/output system (BIOS) 120 including a BIOS security module 125. During a startup of system 100 BIOS security module 125 may store an authorization value 104 in a fixed location 102 of a secure storage 110 accessible to BIOS 120. When authorization value 104 is to be used to generate and/or acquire the encryption keys, an authorization value acquisition module 130 that is trusted by BIOS 120 and/or system 100 may look for authorization value 104 from fixed location 102. Consequently, fixed location 102 may be a location within secure storage 110 known to both BIOS security module 125 and authorization value acquisition module 130 that allows authorization value 104 to be stored in and retrieved from the same location each time system 100 boots. Once authorization value acquisition module 130 acquires authorization value 104 authorization value acquisition module 13C may then overwrite fixed location 102 with random data to prevent other processes from being able to read authorization value 104.

Authorization value acquisition module 130 may then provide authorization value 104 to cryptographic key acquisition module 140 which may obtain the cryptographic key(s) using authorization value 104. In one example, cryptographic key acquisition module 140 may obtain the cryptographic key by generating the cryptographic key based on authorization value 104. This may occur, for example, the first time a cryptographic key is used by system 100. In other examples, cryptographic key acquisition module 140 may retrieve the cryptographic key from a storage location 199 using authorization value 104. By way of illustration, storage location 199 may store a version of the cryptographic key that is itself encrypted based on authorization value 104. Thus, cryptographic key acquisition module 140 may obtain the cryptographic key by decrypting the encrypted version of the cryptographic key using authorization value 104.

In various examples, secure storage 110 may take a variety of forms. The form of secure storage 110 may depend on resources accessible to system 100, and may also dictate the form of fixed location 102, and/or how various components interact with (e.g., access, erase) fixed location 102 and/or authorization value 104. For example, secure storage 110 may be a private memory of BIOS 120. The BIOS private memory may be, for example, a memory with access controlled by BIOS 120 to prevent undesirable accesses. This may ensure that access to the BIOS private memory can only be made by, for example, processes trusted by BIOS 120, API calls to BIOS code that can protect the private memory from undesirable modifications and access, and so forth. Thus, fixed location 102 may be a unified extensible firmware interface (UEFI) variable. This may mean that authorization value acquisition module 130 reads authorization value 104 from fixed location 102 using a private BIOS call using administrator privileges. For example, for a system 100 running a Windows operating system, the private BIOS call may take the form of a windows management instrumentation (WMI) call.

In another example, secure storage 110 may be a trusted platform module. Thus, fixed location 102 may be a platform configuration register. In this example, authorization value acquisition module 130 may read authorization value 104 from the platform configuration register directly using an operation with administrator privileges. Further, in this example, erasing the platform configuration register may involve extending the platform configuration register with random data.

While illustrated as separate components in this example, in other implementations, various other components of system 100 may be implemented as a part of BIOS 120. For example, authorization value acquisition module 130 and/or cryptographic key acquisition module 140 may be instructions implemented at the BIOS level, and, as described above, secure storage 110 may be a BIOS private memory.

It is appreciated that in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
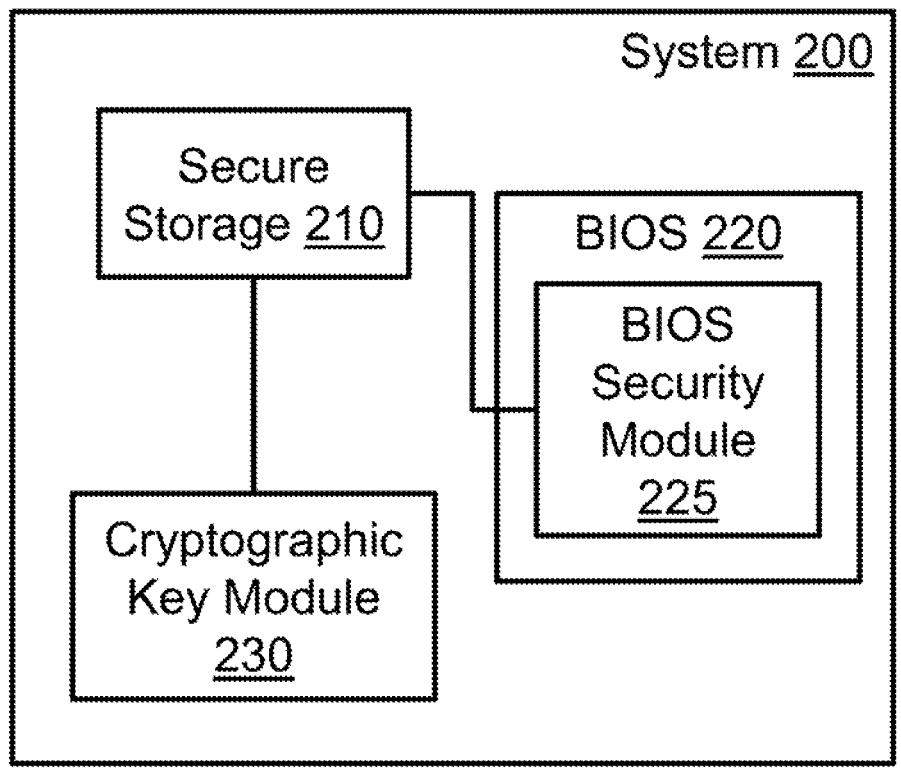
FIG. 2 illustrates another example system associated with cryptographic key security.

FIG. 2 illustrates an example system 200 associated with cryptographic key security. System 200 includes a secure storage 210. Secure storage 210 may be accessible to a basic input/output system 220. System 200 also includes a BIOS security module 225 to store an authorization value in secure storage 210. The authorization value may be stored in secure storage 210 in a fixed location. The authorization value may be stored in secure storage 210 during a boot of system 200. In some examples, secure storage 210 may be a private memory of BIOS 220. Thus, the fixed location may be a unified extensible firmware interface (UEFI) variable. In other examples, secure storage 210 may be a trusted platform module. Here, the fixed location may be a pre-determined platform configuration register.

System 200 also includes a cryptographic key module 230. Cryptographic key module 230 may read the authorization value from the fixed location in secure storage 210. By way of illustration, when the fixed location is a UEFI variable, cryptographic key module 230 may read the authorization value from the UEFI variable using a private BIOS call using administrator privileges. Cryptographic key module 230 may also overwrite the authorization value in the fixed location. By way of illustration, when the fixed location is a platform configuration register, overwriting the authorization value may involve extending the register with random data. Cryptographic key module 230 may also obtain a cryptographic key using the authorization value. In one example, the cryptographic key may be obtained by generating the cryptographic key using the authorization value. In other examples, the cryptographic key may be obtained by using the authorization value to access the cryptographic key on a storage accessible to system 200.

Figure 3:
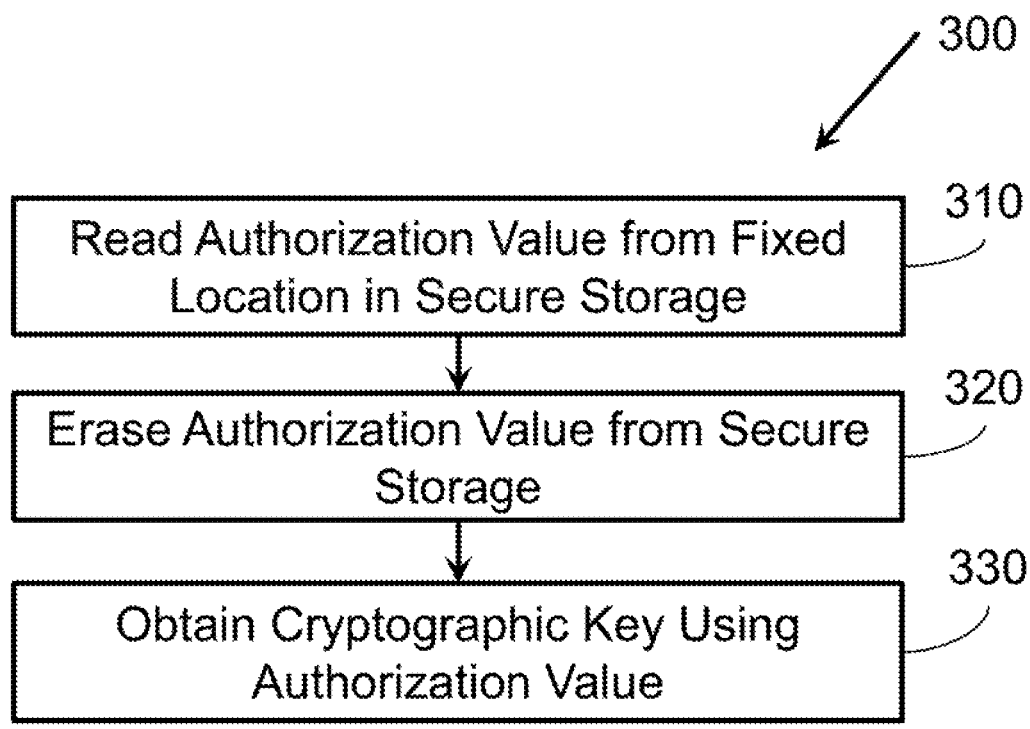
FIG. 3 illustrates a flowchart of example operations associated with cryptographic key security.

FIG. 3 illustrates an example method 300. Method 300 may be embodied on a non-transitory processor-readable medium storing processor-executable instructions. The instructions, when executed by a processor, may cause the processor to perform method 300. In other examples, method 300 may exist within logic gates and/or RAM of an application specific integrated circuit (ASIC).

Method 300 may perform various tasks associated with cryptographic key security. Method 300 includes reading an authorization value at 310. The authorization value may be read from a fixed location in a secure storage. The authorization value may be stored in the fixed location during a startup of a basic input/output system (BIOS). The fixed location may be, for example, a BIOS private memory accessible via a unified extensible firmware interface (UEFI) variable, a trusted platform module platform configuration register, and so forth.

Method 300 also includes erasing the authorization value from the fixed location at 320. Erasing the authorization value may include writing random data to the fixed location. Method 300 also includes obtaining a cryptographic key using the authorization value at 330. The cryptographic key may be obtained by, for example, generating the cryptographic key using the authorization value, accessing the authorization value from a storage location using the authorization value, and so forth.

Figure 4:
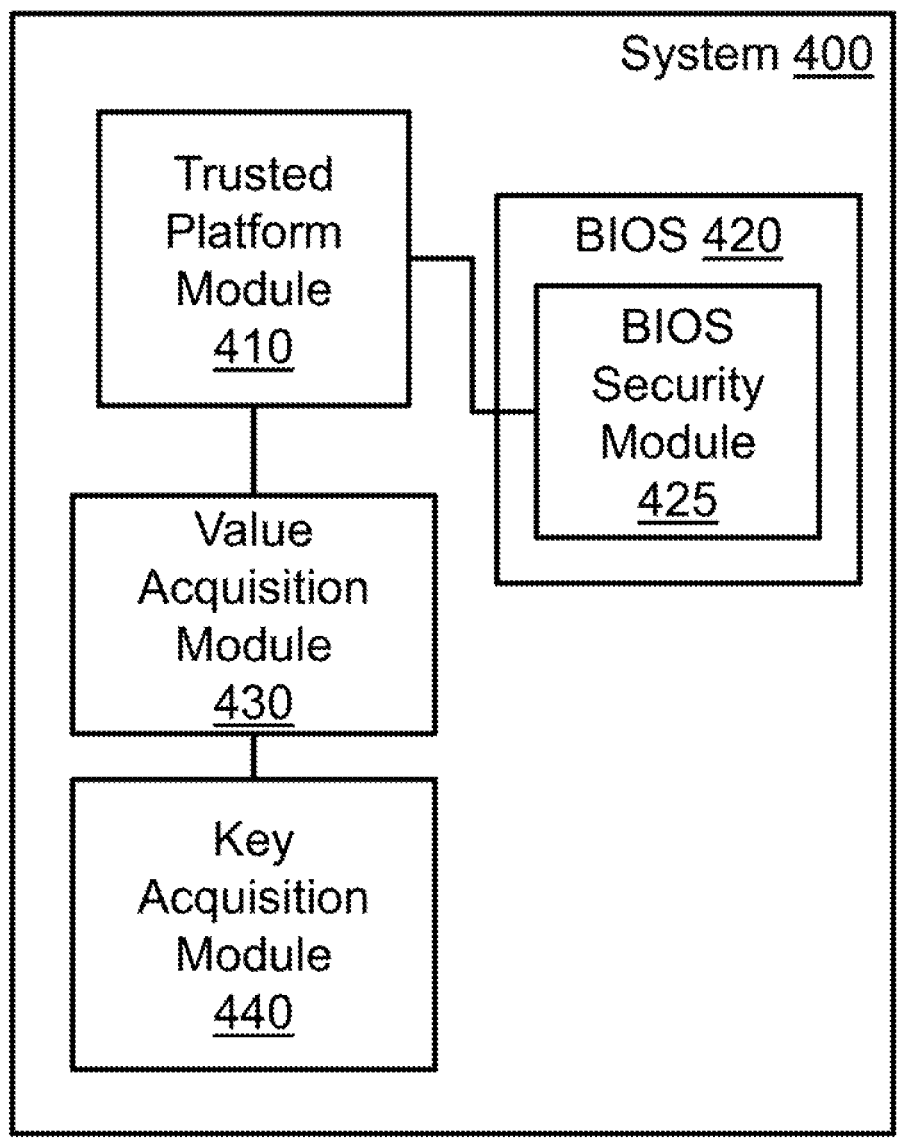
FIG. 4 illustrates another example system associated with cryptographic key security.

FIG. 4 illustrates a system 400 associated with cryptographic key security. System 400 includes a trustee platform module 410. Trusted platform module may include a platform configuration register accessible to a basic input/output system (BIOS) 420. BIOS 420 may include a BIOS security module 425. BIOS security module may store the authorization value in the platform configuration register during the startup of system 400.

System 400 also includes a value acquisition module 430. Value acquisition module 430 may obtain the authorization value from the platform configuration module. Value acquisition module 430 may also extend the platform configuration register with random data. This may prevent entities that subsequently access the platform configuration register from obtaining the authorization value.

System 400 also includes a key acquisition module 440. Key acquisition module 440 may obtain a cryptographic key using the authorization value. Key acquisition value may obtain the cryptographic key by generating the cryptographic key using the authorization value, by accessing a secure storage for the cryptographic key using the authorization value, and so forth.

Figure 5:
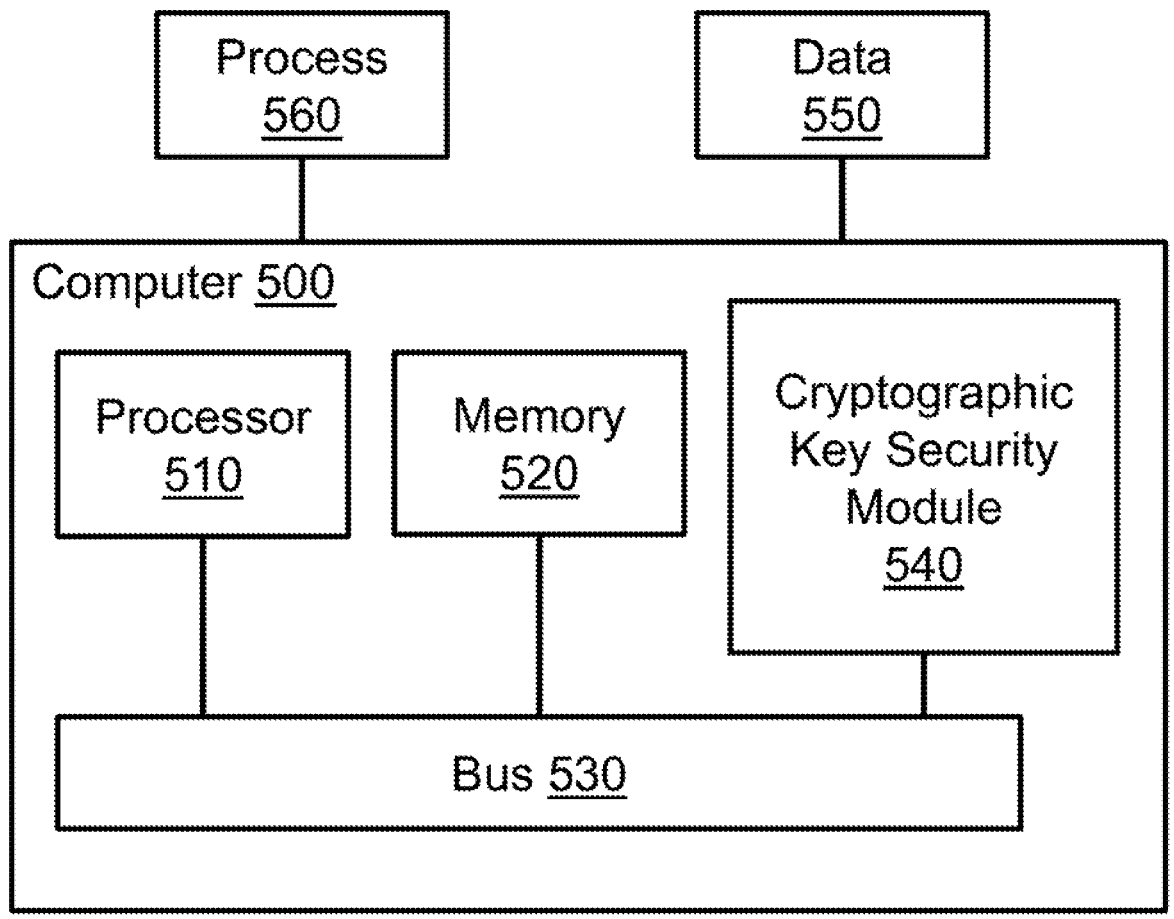
FIG. 5 illustrates an example computing device in which example systems, and methods, and equivalents, may operate.

FIG. 5 illustrates an example computing device in which example systems and methods, and equivalents, may operate. The example computing device may be a computer 500 that includes a processor 510 and a memory 520 connected by a bus 530. Computer 500 includes a cryptographic key security module 540. Cryptographic key security module 540 may perform, alone or in combination, various functions described above with reference to the example systems, methods, and so forth. In different examples, cryptographic key security module 540 may be implemented as a non-transitory computer-readable medium storing processor-executable instructions, in hardware, software, firmware, an application specific integrated circuit, and/or combinations thereof.

The instructions may also be presented to computer 500 as data 550 and/or process 560 that are temporarily stored in memory 520 and then executed by processor 510. The processor 510 may be a variety of processors including dual microprocessor and other multi-processor architectures. Memory 520 may include non-volatile memory (e.g., read-only memory) and/or volatile memory (e.g., random access memory). Memory 520 may also be, for example, a magnetic disk drive, a solid state disk drive, a floppy disk drive, a tape drive, a flash memory card, an optical disk, and so on. Thus, memory 520 may store process 560 and/or data 550. Computer 500 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A system comprising:
   a processor;
   a secure storage accessible to a basic input/output system (BIOS);
   BIOS security instructions executable on the processor to store, during a boot of the system, an authorization value in a fixed location in the secure storage; and
   cryptographic key instructions executable on the processor to:
   read the authorization value from the fixed location;
   in response to reading the authorization value from the fixed location, overwrite the authorization value in the fixed location; and
   obtain a cryptographic key using the authorization value.

2. The system of claim 1, where the cryptographic key is obtained by generating the cryptographic key using the authorization value.

3. The system of claim 1, where the cryptographic key is obtained by accessing, based on the authorization value, the cryptographic key on a storage accessible to the system.

4. The system of claim 1, where the secure storage comprises a private memory of the BIOS and where the fixed location comprises a unified extensible firmware interface (UEFI) variable.

5. The system of claim 4, where the cryptographic key instructions are executable on the processor to read the authorization value from the UEFI variable using a private BIOS call using administrator privileges.

6. The system of claim 1, where the secure storage is part of a trusted platform module, and where the fixed location is a pre-determined platform configuration register.

7. The system of claim 6, where the overwriting of the authorization value includes extending the platform configuration register with random data.

8. A non-transitory computer-readable medium storing processor executable instructions that, when executed by a processor control the processor to:
   read an authorization value from a fixed location in a secure storage, where the authorization value was stored in the fixed location during a startup of a basic input/output system (BIOS);
   in response to reading the authorization value from the fixed location in the secure storage, erase the authorization value from the fixed location; and
   obtain a cryptographic key using the authorization value.

9. The non-transitory computer-readable medium of claim 8, where the erasing of the authorization value includes writing random data to the fixed location.

10. The non-transitory computer-readable medium of claim 8, where the fixed location is in a BIOS private memory accessible via a unified extensible firmware interface (UEFI) variable.

11. The non-transitory computer-readable medium of claim 8, where the fixed location comprises a trusted platform module platform configuration register.

12. The non-transitory computer-readable medium of claim 8, where the cryptographic key is obtained by one of generating the cryptographic key using the authorization value and accessing the cryptographic key from a storage location using the authorization value.

13. A system comprising:
    a trusted platform module comprising a first platform configuration register accessible to a basic input/output system (BIOS);
    a processor;
    BIOS security instructions executable on the processor to store an authorization value in the platform configuration register during a startup of the system;
    value acquisition instructions executable on the processor to obtain the authorization value from the platform configuration register and to, in response to obtaining the authorization value from the platform configuration register, extend the platform configuration register with random data; and
    key acquisition instructions executable on the processor to obtain a cryptographic key using the authorization value.

14. The system of claim 13, where the key acquisition instructions are executable on the processor is to generate the cryptographic key using the authorization value.

15. The system of claim 13, where the key acquisition instructions are executable on the processor is to obtain the cryptographic key from a storage accessible to the system using the authorization value.

* * * * *